US012439951B2

United States Patent
Davis et al.

(10) Patent No.: US 12,439,951 B2
(45) Date of Patent: Oct. 14, 2025

(54) AEROSOLIZABLE MATERIAL WITH CANNABINOID AND CARRIER CONSTITUENT

(71) Applicants: Nicoventures Trading Limited, London (GB); RAI Strategic Holdings Inc, Winston-Salem, NC (US)

(72) Inventors: Michael Foster Davis, Winston-Salem, NC (US); John Will Caraway, Winston-Salem, NC (US); Karina McQuillan, London (GB); Alice Hughes, London (GB); Maria Montserrat Sanchez Pena, London (GB)

(73) Assignees: Nicoventures Trading Limited, London (GB); RAI Strategic Holdings, Inc., Winston-Salem, NC (US)

( * ) Notice: Subject to any disclaimer, the term of this patent is extended or adjusted under 35 U.S.C. 154(b) by 554 days.

(21) Appl. No.: 17/767,724

(22) PCT Filed: Oct. 8, 2020

(86) PCT No.: PCT/GB2020/052502
§ 371 (c)(1),
(2) Date: Apr. 8, 2022

(87) PCT Pub. No.: WO2021/069907
PCT Pub. Date: Apr. 15, 2021

(65) Prior Publication Data
US 2024/0090561 A1    Mar. 21, 2024

Related U.S. Application Data

(60) Provisional application No. 62/912,970, filed on Oct. 9, 2019.

(51) Int. Cl.
*A24B 15/167*    (2020.01)
*A24B 15/16*    (2020.01)
(Continued)

(52) U.S. Cl.
CPC ............ *A24B 15/167* (2016.11); *A24B 15/16* (2013.01); *A24B 15/301* (2013.01);
(Continued)

(58) Field of Classification Search
CPC ..... A24B 15/167; A24B 15/16; A24B 15/301; A24B 15/302; A24B 15/303; A24B 15/10;
(Continued)

(56) References Cited

U.S. PATENT DOCUMENTS

2014/0209109 A1    7/2014    Larson
2015/0080353 A1*   3/2015    Singh ................... A61P 25/28
                                                              514/569

(Continued)

FOREIGN PATENT DOCUMENTS

CN    108186566 A    6/2018
GB    2569961 A    7/2019
(Continued)

OTHER PUBLICATIONS

International Search Report and Written Opinion for Application No. PCT/GB2020/052502, mailed on Jan. 20, 2021, 14 pages.
(Continued)

*Primary Examiner* — Justin M Kratt
(74) *Attorney, Agent, or Firm* — Womble Bond Dickinson (US) LLP; Mark Deluca

(57) ABSTRACT

An aerosolizable material is provided. The aerosolizable material comprises at least one cannabinoid and at least one carrier constituent, wherein the material does no comprise a surface active constitute. Methods of making the aerosoliz-
(Continued)

able material and articles comprising the aerosolizable material are also provided.

19 Claims, 2 Drawing Sheets

(51) Int. Cl.
| | |
|---|---|
| *A24B 15/30* | (2006.01) |
| *A24F 40/20* | (2020.01) |
| *A24F 40/42* | (2020.01) |
| *A24B 15/10* | (2006.01) |
| *A24B 15/28* | (2006.01) |
| *A24F 40/10* | (2020.01) |
| *A61K 31/05* | (2006.01) |

(52) U.S. Cl.
CPC .......... *A24B 15/302* (2013.01); *A24B 15/303* (2013.01); *A24F 40/20* (2020.01); *A24F 40/42* (2020.01); *A24B 15/10* (2013.01); *A24B 15/283* (2013.01); *A24B 15/284* (2013.01); *A24B 15/30* (2013.01); *A24F 40/10* (2020.01); *A61K 31/05* (2013.01)

(58) Field of Classification Search
CPC ..... A24B 15/283; A24B 15/284; A24B 15/30; A24F 40/20; A24F 40/42; A24F 40/10; A61K 31/05
See application file for complete search history.

(56) References Cited

U.S. PATENT DOCUMENTS

| | | | | |
|---|---|---|---|---|
| 2015/0181924 | A1 | 7/2015 | Llamas | |
| 2018/0271826 | A1* | 9/2018 | Sievers | A61K 9/146 |
| 2018/0289062 | A1* | 10/2018 | Lopez | A61K 31/00 |

FOREIGN PATENT DOCUMENTS

| | | |
|---|---|---|
| WO | 2013116568 | 8/2013 |
| WO | 2015116463 | 8/2015 |

OTHER PUBLICATIONS

Office Action for RU Patent Application No. 20222109337 issued on Jul. 17, 2023.

* cited by examiner

AEROSOLIZABLE MATERIAL WITH CANNABINOID AND CARRIER CONSTITUENT

PRIORITY CLAIM

The present application is a National Phase entry of PCT Application No. PCT/GB2020/052502, filed Oct. 8, 2020, which claims priority from U.S. Provisional Application No. 62/912,970, filed Oct. 9, 2019, each of which is hereby fully incorporated herein by reference.

TECHNICAL FIELD

The present disclosure relates to an aerosolizable material, a method of making said material, as well as containers and systems comprising and using said material.

BACKGROUND

Aerosol delivery systems which generate an aerosol for inhalation by a user are known in the art. Such systems typically comprise an aerosol generator which is capable of converting an aerosolizable material into an aerosol. In some instances, the aerosol generated is a condensation aerosol whereby an aerosolizable material is heated to form a vapor which is then allowed to condense into an aerosol. In other instances, the aerosol generated is an aerosol which results from the atomization of the aerosolizable material. Such atomization may be brought about mechanically, e.g. by subjecting the aerosolizable material to vibrations so as to form small particles of material that are entrained in airflow. Alternatively, such atomization may be brought about electrostatically, or in other ways, such as by using pressure etc.

Depending on the constituents of the aerosolizable material that are to be provided to a user, it may be preferable to formulate the aerosolizable material in a certain way. For example, it may be preferable to formulate the aerosolizable material so as to produce an aerosol with a particular profile. It may also be preferable to formulate the aerosolizable material so as to ensure the aerosolizable material meets certain standards of quality, consistency and the like.

It would thus be desirable to provide an aerosolizable material that is formulated so as to be acceptable to a user.

SUMMARY

In one aspect there is provided an aerosolizable material comprising at least one cannabinoid and at least one carrier constituent, wherein the material does not comprise a surface active constituent.

In a further aspect there is provided an article comprising the aerosolizable material as defined herein.

In a further aspect there is provided an aerosol provision system comprising an aerosol provision device and an article as defined herein.

In a further aspect there is provided a method for producing the aerosolizable material as defined herein, the method comprising combining at least one cannabinoid with at least one carrier constituent, but with the proviso that a surface active constituent is not added during the method.

These aspects and other aspects will be apparent from the following detailed description. In this regard, particular sections of the description are not to be read in isolation from other sections.

BRIEF DESCRIPTION OF THE DRAWINGS

Various embodiments will now be described in detail by way of example only with reference to the accompanying drawings in which.

DETAILED DESCRIPTION OF THE DRAWINGS

Figure 1:
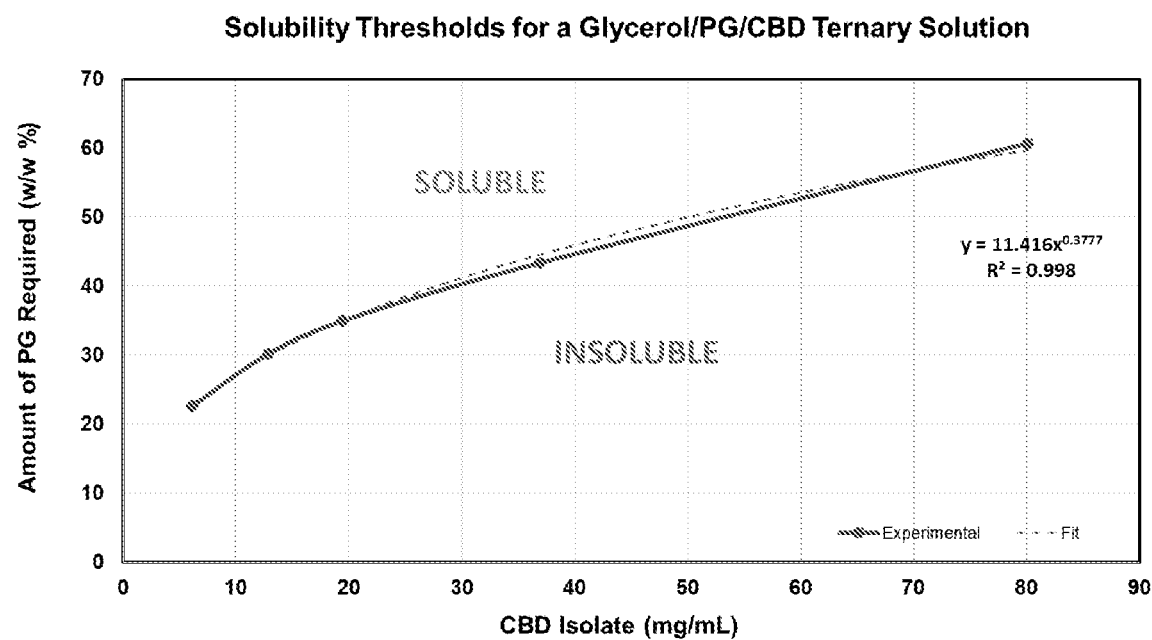
FIG. 1 is a solubility graph for a ternary aerosolizable material comprising propylene glycol/glycerol/cannabidiol.

In one aspect there is provided an aerosolizable material comprising at least one cannabinoid and at least one carrier constituent, wherein the material does not comprise a surface active constituent.

At room temperature, some cannabinoids, such as cannabidiol, are crystalline solids. Therefore, in order to be provided in liquid form, it is generally required to provide a solution containing the cannabinoid. However, some cannabinoids, such as cannabidiol, are insoluble in water. On the other hand, water is often present in aerosolizable materials (liquids) that are used in aerosol provision systems such as e-cigarettes. The presence of such water could inhibit the solubility of the cannabinoid in the aerosolizable material, and such inhibition may be mitigated by additionally using a surface active constituent, such as an emulsifier or surfactant. However, it may not be desirable to include such surface active constituents due to user acceptability. The present inventors have found that it is possible to provide a stable aerosolizable material comprising at least one cannabinoid, such as cannabidiol, without the need for surface active constituents.

Therefore, the aerosolizable material disclosed herein does not comprise a surface active constituent. Examples of surface active constituents include medium chain triglycerides (MCT) and tocopherol acetate.

In some embodiments, the aerosolizable material has a turbidity of about 10 NTU (Nephelometric Turbidity Units) or less.

In this regard, the present inventors have found that when preparing an aerosolizable material comprising a cannabinoid, it is desirable to ensure that the turbidity of the aerosolizable material is 10 NTU or less. When the turbidity of the aerosolizable material is above this range, it is a sign that one or more of the constituents of the aerosolizable material is not present in the aerosolizable material in a stable manner. This could impact the use of the aerosolizable material in a number of ways. For example, the user may perceive the lack of stability and form an opinion that the aerosolizable material is of inferior quality. Alternatively or additionally, such instability may lead to inefficient transfer of one or more constituents from the aerosolizable material to the aerosol. Likewise, such instability may lead to the aerosolizable material causing suboptimal performance of any system or device using the aerosolizable material. The present inventors have found that issues of stability may be particularly pronounced when the aerosolizable material comprises a cannabinoid and have thus found that ensuring the aerosolizable material has a turbidity of 10 NTU or less is important.

In some embodiments, the turbidity of the aerosolizable material is about 10 NTU or less. In some embodiments, the turbidity of the aerosolizable material is about 9 NTU or less. In some embodiments, the turbidity of the aerosolizable material is about 8 NTU or less. In some embodiments, the turbidity of the aerosolizable material is about 7 NTU or less. In some embodiments, the turbidity of the aerosolizable material is about 6 NTU or less. In some embodiments, the turbidity of the aerosolizable material is about 5 NTU or less. In some embodiments, the turbidity of the aerosolizable material is about 4 NTU or less. In some embodiments, the turbidity of the aerosolizable material is about 3 NTU or less. In some embodiments, the turbidity of the aerosolizable material is about 2 NTU or less. In some embodiments, the turbidity of the aerosolizable material is about 1.5 NTU or less. In some embodiments, the turbidity of the aerosolizable material is about 1 NTU or less. In some embodiments, the turbidity of the aerosolizable material is about 0.9 NTU or less.

In some embodiments, the turbidity of the aerosolizable material is about 0.8 NTU or less.

In some embodiments, the turbidity of the aerosolizable material is about 0.7 NTU or less.

In some embodiments, the turbidity of the aerosolizable material is about 0.6 NTU or less.

In some embodiments, the turbidity of the aerosolizable material is about 0.5 NTU or less.

In some embodiments, the turbidity of the aerosolizable material is about 0.4 NTU or less.

In some embodiments, the turbidity of the aerosolizable material is about 0.3 NTU or less.

In some embodiments, the turbidity of the aerosolizable material is about 0.2 NTU or less.

In some embodiments, the turbidity of the aerosolizable material is from about 0.1 NTU to about 1 NTU. In some embodiments, the turbidity of the aerosolizable material is from about 0.2 NTU to about 1 NTU. In some embodiments, the turbidity of the aerosolizable material is from about 0.3 NTU to about 1 NTU. In some embodiments, the turbidity of the aerosolizable material is from about 0.4 NTU to about 1 NTU. In some embodiments, the turbidity of the aerosolizable material is from about 0.5 NTU to about 1 NTU. In some embodiments, the turbidity of the aerosolizable material is from about 0.1 NTU to about 0.9 NTU. In some embodiments, the turbidity of the aerosolizable material is from about 0.1 NTU to about 0.8 NTU. In some embodiments, the turbidity of the aerosolizable material is from about 0.1 NTU to about 0.7 NTU. In some embodiments, the turbidity of the aerosolizable material is from about 0.1 NTU to about 0.6 NTU. In some embodiments, the turbidity of the aerosolizable material is from about 0.1 NTU to about 0.5 NTU.

The turbidity of the aerosolizable material can be measured as is common in the art. For example, by using a TL2310 ISO Turbidimeter from Hach, Colorado, 80539-0389, United States.

Cannabinoids are a class of natural or synthetic chemical compounds which act on cannabinoid receptors (i.e., CB1 and CB2) in cells that repress neurotransmitter release in the brain. Cannabinoids are cyclic molecules exhibiting particular properties such as the ability to easily cross the blood-brain barrier. Cannabinoids may be naturally occurring from plants (Phytocannabinoids) such as *Cannabis*, from animals (endocannabinoids), or artificially manufactured (synthetic cannabinoids). *Cannabis* species express at least 85 different phytocannabinoids, and these may be divided into sub-classes, including cannabigerols, cannabichromenes, cannabidiols, tetrahydrocannabinols, cannabinols and cannabinodiols, and other cannabinoids, such as cannabigerol (CBG), cannabichromene (CBC), cannabidiol (CBD), tetrahydrocannabinol (THC), cannabinol (CBN) and cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), Cannabinol propyl variant (CBNV), cannabitriol (CBO), tetrahydrocannabmolic acid (THCA), and tetrahydrocannabivarinic acid (THCV A).

In one embodiment, the cannabinoid is cannabidiol (CBD) or a pharmaceutically acceptable salt thereof. In one embodiment, the cannabidiol is synthetic cannabidiol. In one embodiment, the cannabidiol is added to the aerosolizable material in the form of an isolate. An isolate is an extract from a plant, such as *cannabis*, where the active material of interest (in this case the cannabinoid, such as CBD) is present in a high degree of purity, for example greater than 95%, greater than 96%, greater than 97%, greater than 98%, or around 99% purity.

The cannabinoid may be present in the aerosolizable material based on a mg/ml basis of the aerosolizable material.

In one embodiment, the cannabinoid is present in an amount of from about 5 mg/ml up to about 100 mg/ml. In one embodiment, the cannabinoid is present in an amount of from about 5 mg/ml up to about 90 mg/ml. In one embodiment, the cannabinoid is present in an amount of from about 5 mg/ml up to about 80 mg/ml. In one embodiment, the cannabinoid is present in an amount of from about 5 mg/ml up to about 70 mg/ml. In one embodiment, the cannabinoid is present in an amount of from about 5 mg/ml up to about 60 mg/ml. In one embodiment, the cannabinoid is present in an amount of from about 5 mg/ml up to about 50 mg/ml. In one embodiment, the cannabinoid is present in an amount of from about 5 mg/ml up to about 40 mg/ml. In one embodiment, the cannabinoid is present in an amount of from about 5 mg/ml up to about 30 mg/ml. In one embodiment, the cannabinoid is present in an amount of from about 5 mg/ml up to about 20 mg/ml. In one embodiment, the cannabinoid is present in an amount of from about 5 mg/ml up to about 10 mg/ml.

In one embodiment, the cannabinoid is present in an amount of about 5 mg/ml or more. In one embodiment, the cannabinoid is present in an amount of about 10 mg/ml or more. In one embodiment, the cannabinoid is present in an amount of about 15 mg/ml or more. In one embodiment, the cannabinoid is present in an amount of about 20 mg/ml or more. In one embodiment, the cannabinoid is present in an amount of about 25 mg/ml or more. In one embodiment, the cannabinoid is present in an amount of about 30 mg/ml or more. In one embodiment, the cannabinoid is present in an amount of about 35 mg/ml or more. In one embodiment, the cannabinoid is present in an amount of about 40 mg/ml or more. In one embodiment, the cannabinoid is present in an amount of about 45 mg/ml or more. In one embodiment, the cannabinoid is present in an amount of about 50 mg/ml or more. In one embodiment, the cannabinoid is present in an amount of about 55 mg/ml or more. In one embodiment, the cannabinoid is present in an amount of about 60 mg/ml or more. In one embodiment, the cannabinoid is present in an amount of about 65 mg/ml or more.

The carrier constituent comprises one or more constituents capable of forming an aerosol, particularly when evaporated and allowed to condense. In some embodiments, the carrier constituent may comprise one or more of glycerol, propylene glycol, triethylene glycol, tetraethylene glycol, 1,3-butylene glycol, erythritol, meso-Erythritol, ethyl vanillate, ethyl laurate, a diethyl suberate, triethyl citrate, triethylene glycol diacetate, triacetin, a diacetin mixture, benzyl benzoate, benzyl phenyl acetate, tributyrin, lauryl acetate, lauric acid, myristic acid, and propylene carbonate.

In one embodiment, the carrier constituent comprises propylene glycol.

In one embodiment, propylene glycol is present in an amount of from 10% weight in weight (w/w) to 95% w/w based on the total weight of the aerosolizable material. In one embodiment, propylene glycol is present in an amount of from 20% w/w to 95% w/w based on the total weight of the aerosolizable material. In one embodiment, propylene glycol is present in an amount of from 30% w/w to 95% w/w based on the total weight of the aerosolizable material. In one embodiment, propylene glycol is present in an amount of from 40% w/w to 95% w/w based on the total weight of the aerosolizable material.

In one embodiment, propylene glycol is present in an amount of from 50% w/w to 90% w/w based on the total weight of the aerosolizable material. In one embodiment, propylene glycol is present in an amount of from 50% w/w to 85% w/w based on the total weight of the aerosolizable material. In one embodiment, propylene glycol is present in an amount of from 50% w/w to 80% w/w based on the total weight of the aerosolizable material. In one embodiment, propylene glycol is present in an amount of from 50% w/w to 75% w/w based on the total weight of the aerosolizable material. In one embodiment, propylene glycol is present in an amount of from 50% w/w to 60% w/w based on the total weight of the aerosolizable material. In one embodiment, propylene glycol is present in an amount of from 50% w/w to 65% w/w based on the total weight of the aerosolizable material. In one embodiment, propylene glycol is present in an amount of from 50% w/w to 60% w/w based on the total weight of the aerosolizable material.

In one embodiment, propylene glycol is present in an amount of from 55% w/w to 90% w/w based on the total weight of the aerosolizable material. In one embodiment, propylene glycol is present in an amount of from 60% w/w to 90% w/w based on the total weight of the aerosolizable material. In one embodiment, propylene glycol is present in an amount of from 65% w/w to 90% w/w based on the total weight of the aerosolizable material. In one embodiment, propylene glycol is present in an amount of from 70% w/w to 90% w/w based on the total weight of the aerosolizable material. In one embodiment, propylene glycol is present in an amount of from 75% w/w to 90% w/w based on the total weight of the aerosolizable material. In one embodiment, propylene glycol is present in an amount of from 80% w/w to 90% w/w based on the total weight of the aerosolizable material. In one embodiment, propylene glycol is present in an amount of from 85% w/w to 90% w/w based on the total weight of the aerosolizable material.

In one embodiment, propylene glycol is present in an amount of at least 10% w/w based on the total weight of the aerosolizable material. In one embodiment, propylene glycol is present in an amount of at least 20% w/w based on the total weight of the aerosolizable material. In one embodiment, propylene glycol is present in an amount of at least 30% w/w based on the total weight of the aerosolizable material. In one embodiment, propylene glycol is present in an amount of at least 40% w/w based on the total weight of the aerosolizable material. In one embodiment, propylene glycol is present in an amount of at least 50% w/w based on the total weight of the aerosolizable material. In one embodiment, propylene glycol is present in an amount of at least 55% w/w based on the total weight of the aerosolizable material. In one embodiment, propylene glycol is present in an amount of at least 60% w/w based on the total weight of the aerosolizable material. In one embodiment, propylene glycol is present in an amount of at least 65% w/w based on the total weight of the aerosolizable material. In one embodiment, propylene glycol is present in an amount of at least 70% w/w based on the total weight of the aerosolizable material. In one embodiment, propylene glycol is present in an amount of at least 75% w/w based on the total weight of the aerosolizable material. In one embodiment, propylene glycol is present in an amount of at least 80% w/w based on the total weight of the aerosolizable material. In one embodiment, propylene glycol is present in an amount of at least 85% w/w based on the total weight of the aerosolizable material. In one embodiment, propylene glycol is present in an amount of at least 90% w/w based on the total weight of the aerosolizable material.

In one embodiment, propylene glycol is present in the aerosolizable material in an amount of about 70% w/w.

In some embodiments, the w/w % amount of propylene glycol in the aerosolizable material, based on the total weight of the aerosolizable material, is equal to or above a threshold C %, the threshold being defined according to $$C_{\%}=11.416\times(A)^{0.377}$$

wherein A is the amount of the at least one cannabinoid present in the aerosolizable material in mg/ml. It has been found that aerosolizable materials comprising at least one cannabinoid, such as cannabidiol, and propylene glycol conforming to the above threshold, are particularly stable.

In some embodiments, the aerosolizable material comprises less than 12% w/w water. In some embodiments, the aerosolizable material comprises less than 11% w/w water. In some embodiments, the aerosolizable material comprises less than 10% w/w water. In some embodiments, the aerosolizable material comprises less than 5% w/w water. In some embodiments, the aerosolizable material comprises less than 1% w/w water. In some embodiments, the aerosolizable material comprises less than 0.5% w/w water. In some embodiments, the aerosolizable material comprises substantially no water.

In one embodiment, the carrier constituent comprises glycerol.

In one embodiment, glycerol is present in an amount of from 10% w/w to 95% w/w based on the total weight of the aerosolizable material. In one embodiment, glycerol is present in an amount of from 20% w/w to 95% w/w based on the total weight of the aerosolizable material. In one embodiment, glycerol is present in an amount of from 30% w/w to 95% w/w based on the total weight of the aerosolizable material. In one embodiment, glycerol is present in an amount of from 40% w/w to 95% w/w based on the total weight of the aerosolizable material. In one embodiment, glycerol is present in an amount of from 50% w/w to 95% w/w based on the total weight of the aerosolizable material.

In one embodiment, glycerol is present in an amount of from 50% w/w to 90% w/w based on the total weight of the aerosolizable material. In one embodiment, glycerol is present in an amount of from 50% w/w to 85% w/w based on the total weight of the aerosolizable material. In one embodiment, glycerol is present in an amount of from 50% w/w to 80% w/w based on the total weight of the aerosolizable material. In one embodiment, glycerol is present in an amount of from 50% w/w to 75% w/w based on the total weight of the aerosolizable material. In one embodiment, glycerol is present in an amount of from 50% w/w to 60% w/w based on the total weight of the aerosolizable material. In one embodiment, glycerol is present in an amount of from 50% w/w to 65% w/w based on the total weight of the aerosolizable material. In one embodiment, glycerol is present in an amount of from 50% w/w to 60% w/w based on the total weight of the aerosolizable material.

In one embodiment, glycerol is present in an amount of from 55% w/w to 90% w/w based on the total weight of the aerosolizable material. In one embodiment, glycerol is present in an amount of from 60% w/w to 90% w/w based on the total weight of the aerosolizable material. In one embodiment, glycerol is present in an amount of from 65% w/w to 90% w/w based on the total weight of the aerosolizable material. In one embodiment, glycerol is present in an amount of from 70% w/w to 90% w/w based on the total weight of the aerosolizable material. In one embodiment, glycerol is present in an amount of from 75% w/w to 90% w/w based on the total weight of the aerosolizable material. In one embodiment, glycerol is present in an amount of from 80% w/w to 90% w/w based on the total weight of the aerosolizable material. In one embodiment, glycerol is present in an amount of from 85% w/w to 90% w/w based on the total weight of the aerosolizable material.

In one embodiment, glycerol is present in an amount of at least 10% w/w based on the total weight of the aerosolizable material. In one embodiment, glycerol is present in an amount of at least 20% w/w based on the total weight of the aerosolizable material. In one embodiment, glycerol is present in an amount of at least 30% w/w based on the total weight of the aerosolizable material. In one embodiment, glycerol is present in an amount of at least 40% w/w based on the total weight of the aerosolizable material. In one embodiment, glycerol is present in an amount of at least 50% w/w based on the total weight of the aerosolizable material. In one embodiment, glycerol is present in an amount of at least 50% w/w based on the total weight of the aerosolizable material. In one embodiment, glycerol is present in an amount of at least 55% w/w based on the total weight of the aerosolizable material. In one embodiment, glycerol is present in an amount of at least 60% w/w based on the total weight of the aerosolizable material. In one embodiment, glycerol is present in an amount of at least 65% w/w based on the total weight of the aerosolizable material. In one embodiment, glycerol is present in an amount of at least 70% w/w based on the total weight of the aerosolizable material. In one embodiment, glycerol is present in an amount of at least 75% w/w based on the total weight of the aerosolizable material. In one embodiment, glycerol is present in an amount of at least 80% w/w based on the total weight of the aerosolizable material. In one embodiment, glycerol is present in an amount of at least 85% w/w based on the total weight of the aerosolizable material. In one embodiment, glycerol is present in an amount of at least 90% w/w based on the total weight of the aerosolizable material.

In one embodiment, the carrier constituent comprises both glycerol and propylene glycol.

In one embodiment, glycerol and propylene glycol are present in the aerosolizable material in the following amounts:

60 to 90% w/w propylene glycol; and 40 to 10% w/w glycerol, based on the total weight of glycerol and propylene glycol present in the aerosolizable material.

In one embodiment, glycerol and propylene glycol are present in the aerosolizable material in the following amounts:

70 to 80% w/w propylene glycol; and 30 to 20% w/w glycerol.

based on the total weight of glycerol and propylene glycol present in the aerosolizable material.

In one embodiment, the aerosolizable material comprises about 70% w/w propylene glycol and about 30% glycerol.

In one embodiment, the aerosolizable material is a liquid at about 25° C.

The aerosolizable material may comprise one or more further constituents. In particular, one or more further constituents may be selected from one or more physiologically and/or olfactory active constituents, and/or one or more functional constituents.

In some embodiments, the further constituent is a physiologically active constituent and may be selected from nicotine, nicotine salts (e.g. nicotine ditartrate/nicotine bitartrate), nicotine-free tobacco substitutes, other alkaloids such as caffeine, or mixtures thereof.

In some embodiments, the further constituent is an olfactory active constituent and may be selected from a "flavor" and/or "flavorant" which, where local regulations permit, may be used to create a desired taste, aroma or sensation in a product for adult consumers. In some instances such constituents may be referred to as flavors, flavorants, cooling agents, heating agents, or sweetening agents, and may include one or more of extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavour flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

The flavor may be added to the aerosolizable material as part of a so-called "flavor block", where one or more flavors are blended together and then added to the aerosolizable material.

In some embodiments, the olfactory active constituent comprises a terpene. In some embodiments, the terpene is a terpene derivable from a phytocannabinoid producing plant, such as a plant from the stain of the *Cannabis sativa* species, such as hemp.

Suitable terpenes in this regard include so-called "C10" terpenes, which are those terpenes comprising 10 carbon atoms, and so-called "C15" terpenes, which are those terpenes comprising 15 carbon atoms.

In some embodiments, the aerosolizable material comprises more than one terpene. For example, the aerosolizable material may comprise one, two, three, four, five, six, seven, eight, nine, ten or more terpenes as defined herein.

In some embodiments, the terpene is selected based on its solubility in a carrier constituent comprising propylene glycol and glycerol.

In this regard, the terpene may be selected on the basis of being soluble when present in a carrier constituent comprising propylene glycol and glycerol, where the w/w % amount of propylene glycol C % present in the material, based on the total weight of the aerosolizable material, is determined on the basis of the following relationship:

$$C_{\%}=11.416\times(A)^{0.377}$$

wherein T is the amount of the at least one terpene present in the aerosolizable material in mg/ml.

By ensuring the selected terpene meets the above threshold when present in a carrier constituent comprising propylene glycol and glycerol, the stability of the aerosolizable material will not be substantially compromised by including a terpene. In other words, the terpene(s) may be selected such that their solubility in propylene glycol is substantially matched to that of cannabidiol.

In some embodiments, the terpene is selected from pinene (alpha and beta), geraniol, linalool, limonene, carvone, eucalyptol, menthone, iso-menthone, piperitone, myrcene, beta-bourbonene, germacrene and mixtures thereof.

In some embodiments, the aerosolizable material comprises a combination of terpenes. In some embodiments, the combination of terpenes may comprise a combination of at least geraniol and linalool. In some embodiments, the combination of terpenes may comprise a combination of at least eucalyptol and menthone. In some embodiments, the combination of terpenes may comprise a combination of at least eucalyptol, carvone, piperitone and menthone. In some embodiments, the combination of terpenes may comprise a combination of at least eucalyptol, carvone, beta-bourbonene, germacrene, piperitone, iso-menthone and menthone.

In one embodiment, the terpene(s) are present in a flavor block. This means that the terpenes are blended with one or more other flavors (optionally with an appropriate solvent, for example propylene glycol) and then the flavor block is added during the manufacture of the aerosolizable material. In some embodiments, the total amount of the flavor block present in the aerosolizable material is up to about 10 w/w %. In some embodiments, the total amount of the flavor block present in the aerosolizable material is up to about 9 w/w %. In some embodiments, the total amount of the flavor block present in the aerosolizable material is up to about 8 w/w %. In some embodiments, the total amount of the flavor block present in the aerosolizable material is up to about 7 w/w %. In some embodiments, the total amount of the flavor block present in the aerosolizable material is up to about 6 w/w %. In some embodiments, the total amount of the flavor block present in the aerosolizable material is up to about 5 w/w %.

In one embodiment, the total amount of terpene present in the aerosolizable material is up to about 10 mg/ml. In one embodiment, the total amount of terpene present in the aerosolizable material is up to about 9 mg/ml. In one embodiment, the total amount of terpene present in the aerosolizable material is up to about 8 mg/ml. In one embodiment, the total amount of terpene present in the aerosolizable material is up to about 7 mg/ml. In one embodiment, the total amount of terpene present in the aerosolizable material is up to about 6 mg/ml. In one embodiment, the total amount of terpene present in the aerosolizable material is up to about 5 mg/ml. In one embodiment, the total amount of terpene present in the aerosolizable material is up to about 4 mg/ml. In one embodiment, the total amount of terpene present in the aerosolizable material is up to about 3 mg/ml. In one embodiment, the total amount of terpene present in the aerosolizable material is up to about 2 mg/ml. In one embodiment, the total amount of terpene present in the aerosolizable material is up to about 1 mg/ml.

In one embodiment, the total amount of terpene present in the aerosolizable material is from about 0.1 mg/ml up to about 10 mg/ml. In one embodiment, the total amount of terpene present in the aerosolizable material is from about 0.2 mg/ml up to about 10 mg/ml. In one embodiment, the total amount of terpene present in the aerosolizable material is from about 0.3 mg/ml up to about 10 mg/ml. In one embodiment, the total amount of terpene present in the aerosolizable material is from about 0.4 mg/ml up to about 10 mg/ml. In one embodiment, the total amount of terpene present in the aerosolizable material is from about 0.5 mg/ml up to about 10 mg/ml. In one embodiment, the total amount of terpene present in the aerosolizable material is from about 1.0 mg/ml up to about 10 mg/ml. In one embodiment, the total amount of terpene present in the aerosolizable material is from about 2.0 mg/ml up to about 10 mg/ml. In one embodiment, the total amount of terpene present in the aerosolizable material is from about 3.0 mg/ml up to about 10 mg/ml. In one embodiment, the total amount of terpene present in the aerosolizable material is from about 4.0 mg/ml up to about 10 mg/ml. In one embodiment, the total amount of terpene present in the aerosolizable material is from about 5.0 mg/ml up to about 10 mg/ml.

In one embodiment, the total amount of terpene present in the aerosolizable material is from about 0.1 mg/ml up to about 9.0 mg/ml. In one embodiment, the total amount of terpene present in the aerosolizable material is from about 0.1 mg/ml up to about 8.0 mg/ml. In one embodiment, the total amount of terpene present in the aerosolizable material is from about 0.1 mg/ml up to about 7.0 mg/ml. In one embodiment, the total amount of terpene present in the aerosolizable material is from about 0.1 mg/ml up to about 6.0 mg/ml. In one embodiment, the total amount of terpene present in the aerosolizable material is from about 0.1 mg/ml up to about 5.0 mg/ml. In one embodiment, the total amount of terpene present in the aerosolizable material is from about 0.1 mg/ml up to about 1 mg/ml. In one embodiment, the total amount of terpene present in the aerosolizable material is from about 0.1 mg/ml up to about 0.9 mg/ml. In one embodiment, the total amount of terpene present in the aerosolizable material is from about 0.1 mg/ml up to about 0.8 mg/ml. In one embodiment, the total amount of terpene present in the aerosolizable material is from about 0.1 mg/ml up to about 0.7 mg/ml. In one embodiment, the total amount of terpene present in the aerosolizable material is from about 0.1 mg/ml up to about 0.6 mg/ml. In one embodiment, the total amount of terpene present in the aerosolizable material is from about 0.1 mg/ml up to about 0.5 mg/ml.

For the avoidance of doubt, combinations of the above end points are explicitly envisaged by the present disclosure. This applies to any of the ranges disclosed herein.

The one or more other functional constituents may comprise one or more of pH regulators, coloring agents, preservatives, binders, fillers, and/or antioxidants. In particular, the pH regulator may include one or more acids selected from organic or inorganic acids. An example of an inorganic acid is phosphoric acid. The organic acid may include a carboxylic acid. The carboxylic acid may be any suitable carboxylic acid. In one embodiment the acid is a mono-carboxylic acid. In one embodiment the acid may be selected from the group consisting of acetic acid, lactic acid, formic acid, citric acid, benzoic acid, pyruvic acid, levulinic acid, succinic acid, tartaric acid, oleic acid, sorbic acid, propionic acid, phenylacetic acid, and mixtures thereof.

In some embodiments, an acceptable turbidity of the aerosolizable material is achieved without the use of any/significant amounts of water. In this regard, whilst water may otherwise assist in the preparation of aerosolizable materials since water containing materials may have a lower viscosity and therefore may be transferred more easily to an aerosol-generating component, it has been found in the context of the present disclosure that water can negatively influence the stability of the aerosolizable material containing at least one cannabinoid.

In some embodiments, the aerosolizable material comprises less than 12% w/w water. In some embodiments, the aerosolizable material comprises less than 11% w/w water. In some embodiments, the aerosolizable material comprises less than 10% w/w water. In some embodiments, the aerosolizable material comprises less than 5% w/w water.

In some embodiments, the aerosolizable material comprises less than 1% w/w water.

In some embodiments, the aerosolizable material comprises less than 0.5% w/w water. In some embodiments, the aerosolizable material comprises substantially no water.

In particular, it has been found that for certain aerosolizable materials comprising a cannabinoid, such as cannabidiol, if the aerosolizable material comprises water in amounts of about 12% w/w, the cannabinoid is rendered unstable.

In a further aspect there is provided an article comprising the aerosolizable material as defined herein.

The article may be a container, such as a bottle, or may be a component for use with an aerosol provision device.

For example, the article may comprise a reservoir for receiving the aerosolizable material defined herein, an aerosol-generating component, an aerosol-generating area, and/or a mouthpiece.

In some embodiments, there is provided an article for use with an aerosol provision system, the article comprising a reservoir comprising an aerosolizable material as defined herein, an aerosol-generating component (such as a heater), an aerosol-generating area, a transport element, and a mouthpiece.

Aerosolizable material may be transferred from the reservoir for receiving an aerosolizable material to the aerosol-generating component via a transport element, such as a transport element, pump or the like. The skilled person is able to select suitable transport elements depending on the type of aerosolizable material that is to be transported and the rate at which it must be supplied. Particular mention may be made of transport elements, such as transport element s, formed from fibrous materials, foamed materials, sintered materials, woven and non-woven materials.

An airflow pathway typically extends through the article (optionally via the device) to an outlet. The pathway is oriented such that generated aerosol is entrained in the airflow such that it can be delivered to the outlet for inhalation by a user.

In one embodiment, the aerosol-generating component is a heater.

Typically, the area for receiving an aerosolizable material will allow for the article to be refilled with aerosolizable material as the aerosolizable material is depleted during use.

Figure 2:
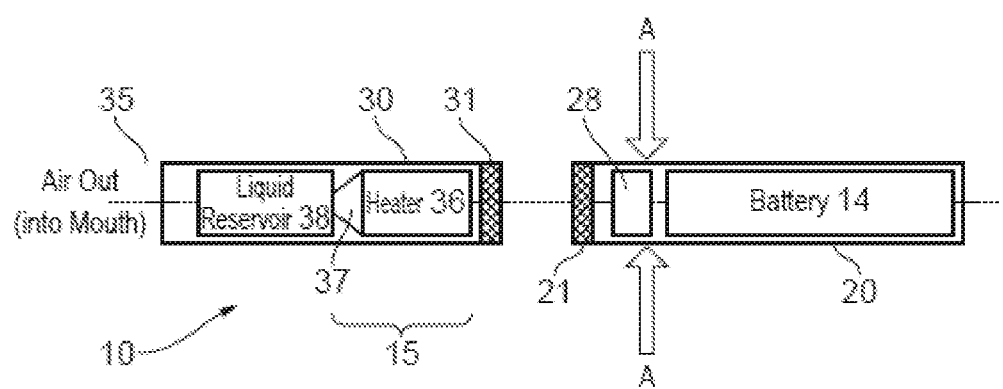
FIG. 2 is a schematic representation of one embodiment of an article, aerosol provision device and aerosol provision system as described herein.

FIG. 2 is a schematic representation (not to scale) of one embodiment of an aerosol provision system 10, such as an e-cigarette. The aerosol provision system 10 has a generally cylindrical shape, extending along a longitudinal axis indicated by a dashed line (although aspects of the invention are applicable to aerosol provision system configured in other shapes and arrangements), and comprises two main components, namely an aerosol provision device 20 and an article 30.

The article 30 includes a reservoir 38 containing an aerosolizable material from which an aerosol is to be generated. The article 30 further comprises an aerosol-generating component (heating element or heater) 36 for heating aerosolizable material to generate the aerosol. A transport element or wicking element or wick 37 is provided to deliver aerosolizable material from the reservoir 38 to the aerosol generating component 36. A part or parts of the transport element 37 are in fluid communication with aerosolizable material in the reservoir 38 and by a transport element or capillary action aerosolizable material is drawn along or through the transport element 37 to a part or parts of the transport element 37 which are in contact with the aerosol-generating component 36.

Vaporization of the aerosolizable material occurs at the interface between the transport element 37 and the aerosol generating component 36 by the provision of heat energy to the aerosolizable material to cause evaporation, thus generating the aerosol. The aerosolizable material, the transport element 37 and the aerosol generating component 36 may be collectively referred to as an aerosol or vapor source. The transport element 37 and the aerosol generating component 36 may be collectively referred to as a vaporizer or an atomizer 15.

Typically a single transport element will be present, but it is envisaged that more than one transport element could be present, for example, two, three, four or five transport elements.

As described above, the transport element may be formed a sintered material. The sintered material may comprise sintered ceramic, sintered metal fibers/powders, or a combination of the two. The (or at least one of/all of the) sintered transport element(s) may have deposited thereon/embedded therein an electrically resistive heater. Such a heater may be formed from heat conducting alloys such as NiCr alloys. Alternatively, the sintered material may have such electrical properties such that when a current is passed there through, it is heated. Thus, the aerosol generating component and the transport element may be considered to be integrated. In some embodiments, the aerosol-generating component and the transport element are formed from the same material and form a single component.

In some embodiments, the transport element is formed from a sintered metal material and is generally in the form of a planar sheet. Thus, the transport element may have a substantially thin flat shape. For example it may be considered as a sheet, layer, film, substrate or the like. By this it is meant that a thickness of the transport element is less or very much less than at least one of the length and the width of the transport element. Thus, the transport element thickness (its smallest dimension) is less or very much less than the longest dimension.

The transport element may be made of a homogenous, granular, fibrous or flocculent sintered metal(s) so as to form said capillary structure. Transport element elements can be made from a conductive material which is a nonwoven sintered porous web structure comprising metal fibers, such as fibers of stainless steel. For example, the stainless steel may be AISI (American Iron and Steel Institute) 316 L (corresponding to European standard 1.4404). The material's weight may be in the range of 100-300 g/m$^2$.

Where the transport element is generally planar, the thickness of the transport element may be in the range of 75-250 μm. A typical fiber diameter may be about 12 μm, and a typical mean pore size (size of the voids between the fibers) may be about 32 μm. An example of a material of this type is Bekipor (®) ST porous metal fiber media manufactured by NV Bekaert SA, Belgium, being a range of porous nonwoven fiber matrix materials made by sintering stainless steel fibers.

Note also that while the transport element is described as planar, this refers to the relative dimensions of the sheet material and the transport element (a thickness many times smaller than the length and/or width) but does not necessarily indicate flatness, in particular of the final transport element made from the sheet material. A transport element may be flat but might alternatively be formed from sheet material into a non-flat shape such as curved, rippled, corrugated, ridged, formed into a tube or otherwise made concave and/or convex.

The transport element may have various properties. It is formed from a porous material to enable the required wicking or capillary effect for drawing source liquid through it from a reservoir containing aerosolizable material (where the transport element meets the aerosolizable material at a reservoir contact site) to the vaporization interface. Porosity is typically provided by a plurality of interconnected or partially interconnected pores (holes or interstices) throughout the transport element, and open to the outer surface of the transport element. Any level of porosity may be employed depending on the material, the size of the pores and the required rate of transport. For example a porosity of between 30% and 85% might be selected, such as between 40% and 70%, between 50% and 80%, between 35% and 75% or between 40% and 75%. This might be an average porosity value for the whole transport element, since porosity may or may not be uniform across the transport element. For example, pore size at the reservoir contact site might be different from pore size nearer to the aerosol generating component.

It is useful for the transport element to have sufficient rigidity to support itself in a required within the aerosol provision system 10. For example, it may be mounted at or near one or two edges and be required to maintain its position substantially without flexing, bending or sagging.

As an example, porous sintered ceramic is a useful material to use as the transport element. Any ceramic with appropriate porosity may be used. If porous ceramic is chosen as the porous transport element material, this is available as a powder which can be formed into a solid by sintering (heating to cause coalescence, possibly under applied pressure). Sintering then solidifies the ceramic to create the porous transport element material.

The article 30 further includes a mouthpiece 35 having an opening through which a user may inhale the aerosol generated by the atomizer 15. The aerosol for inhalation may be described as an aerosol stream or inhalable airstream.

The aerosol provision device 20 includes a power source 14 (e.g., a re-chargeable cell or battery) to provide power for the aerosol provision system 10, and a controller 28 (e.g., a printed circuit board (PCB)) and/or other electronics for generally controlling the aerosol provision system 10. The aerosol provision device 20 can therefore also be considered as a battery section, or a control unit or section.

During operation of the aerosol provision system 10, the controller 28 will determine that a user has initiated a request for the generation of an aerosol. This could be done via a button on the aerosol provision system 10 which sends a signal to the controller 28 that the aerosol generator should be powered. Alternatively, a sensor located in or proximal to the airflow pathway could detect airflow through the airflow pathway and convey this detection to the controller 28. A sensor may also be present in addition to the presence of a button, as the sensor may be used to determine certain usage characteristics, such as airflow, timing of aerosol generation etc.

For example, in use, when the aerosol generating component 36 receives power from the battery 14, as controlled by the circuit board 28 possibly in response to pressure changes detected by an air pressure sensor (not shown), the aerosol generating component 36 vaporizes aerosolizable material delivered by the transport element 37 to generate the aerosol, and this aerosol stream is then inhaled by a user through the opening in the mouthpiece 35. The aerosol is carried from the aerosol source to the mouthpiece 35 along an air channel (not shown in FIG. 2) that connects the aerosol source to the mouthpiece opening as a user inhales on the mouthpiece 35.

In this particular example, the aerosol provision device 20 and article 30 are detachable from one another by separation in a direction parallel to the longitudinal axis, as shown in FIG. 2, but are joined together when the aerosol provision system 10 is in use by cooperating engagement elements 21, 31 (for example, a screw, magnetic or bayonet fitting) to provide mechanical and electrical connectivity between the aerosol provision device 20 and the article 30, in particular connecting the aerosol generating component 36 to the power source 14. The power source 14 may be charged as is known to one skilled in the art.

In some embodiments, the article 30 comprises/forms a sealed container. For example, the sealed container may be hermetically sealed. The present inventors have found that inclusion of the aerosolizable material in a sealed article assists in preventing water ingress into the system, which can prevent the cannabinoid from precipitating. The hermetically sealed container may comprise a blister pack with one or more hermetically sealed compartments for storage of one or more articles 30 comprising the aerosolizable material described herein.

In some embodiments, the article 30 comprises a reservoir 38 within which the aerosolizable material is contained. The reservoir 38 may be transparent such that the aerosolizable material can be viewed from outside of the reservoir 38. It may also be that the reservoir 38 has a degree of opacity such that the passage of light through the reservoir 38 is limited. This can be important so as to prevent light (such as ultra violet light) from entering the reservoir 38 and compromising the stability of the aerosolizable material. In this regard, the present inventors have considered that cannabinoids may be particularly susceptible to such light destabilization. In some embodiments, the reservoir 38 is formed from a material which inhibits the passage of ultra violet light therethrough. In some embodiments, it may be that the sealed container mentioned above is formed from a material which has a degree of opacity such that the passage of light through the sealed container is limited. Further, the sealed container mentioned above may be formed from a material which inhibits/prevents the passage of ultra violet light therethrough. This may be in addition to said sealed container being hermetically sealed and/or comprising a blister pack with one or more hermetically sealed compartments for storage of one or more articles 30 comprising the aerosolizable material described herein.

In a further aspect there is provided an aerosol provision system comprising an aerosol provision device and an article as defined herein.

In a further aspect there is provided a method for producing the aerosolizable material as defined herein, the method comprising combining at least one cannabinoid with at least one carrier constituent, but with the proviso that a surface active constituent is not added during the method. In this regard, the present method may be further defined according to any of the features described above.

In some embodiments, the method further excludes a step of adding water to the aerosolizable material.

In a further aspect, there is provided a method for producing an aerosol comprising generating an aerosol from an aerosolizable material as defined herein.

EXPERIMENTAL METHODS

Turbidity

The turbidity of the aerosolizable material may be determined according to procedures known in the art to the skilled person. Generally, the turbidity of the aerosolizable material may be determined according to methods known in the art. In particular, the turbidity readings should be conducted on an instrument outfitted for ISO testing, as this ensures absorption in the visible spectrum does not bias the readings. For example, the turbidity of the aerosolizable materials described herein can generally be measured using a TL2310 ISO Turbidimeter commercially available from Hach, Colorado, 80539-0389, United States. The meter can measure from 0-1000 NTU (Nephelometric Turbidity Units).

EXAMPLES

Example 1

Various ternary solutions of glycerol, propylene glycol and cannabidiol were prepared as shown in Table 1.

TABLE 1

| CBD (mg/mL) | Glycerol (w/w) | PG (w/w) |
|---|---|---|
| 5 | 78.6 | 21.0 |
| 10 | 71.9 | 27.2 |
| 15 | 67.0 | 31.7 |
| 20 | 62.9 | 35.4 |
| 25 | 59.3 | 38.5 |
| 30 | 56.1 | 41.2 |
| 35 | 53.2 | 43.7 |
| 40 | 50.5 | 46.0 |
| 45 | 48.0 | 48.1 |
| 50 | 45.6 | 50.0 |
| 55 | 43.4 | 51.9 |
| 60 | 41.2 | 53.6 |
| 65 | 39.1 | 55.2 |
| 70 | 37.1 | 56.8 |
| 75 | 35.2 | 58.3 |
| 80 | 33.3 | 59.7 |
| 85 | 31.5 | 61.1 |
| 90 | 29.4 | 62.5 |
| 95 | 27.7 | 63.8 |
| 100 | 26.0 | 65.0 |

As shown in FIG. 1, it has been found that aerosolizable materials which are prepared so as to substantially conform to $C_\% = 11.416 \times (A)^{0.377}$ are particularly stable. In particular, very low levels of precipitated cannabidiol were observed when the threshold was adhered to.

Furthermore, there was no need for the inclusion of a surface active constituent in order to ensure stability of the aerosolizable material.

Example 2

Various solutions of glycerol, propylene glycol, water and cannabidiol were prepared as shown in Table 2.

TABLE 2

| Glycerol (w/w) | PG (w/w) | Water (w/w) | Isolate (mg/mL) | Soluble |
|---|---|---|---|---|
| 36 | 47.09 | 16 | 10 | NO |
| 36 | 49.09 | 14 | 10 | NO |
| 36 | 51.09 | 12 | 10 | NO |
| 36 | 52.09 | 11 | 10 | YES |
| 36 | 53.09 | 10 | 10 | YES |

As can be seen from Table 2, it has been found that when high amounts of water are present, the ability of propylene glycol to solubilize cannabidiol is suppressed. Thus, by controlling the amount of water present in the system, there was no need for the inclusion of a surface active constituent in order to ensure stability of the aerosolizable material.

Example 3

Samples of aerosolizable material were prepared and their turbidity assessed.

Sample 1—Turbidity=0.343 NTU

| | |
|---|---|
| PG | 87.0000 |
| CBD Isolate (≥98.5% Purity) | 13.0000 |
| TOTAL (% w/w) | 100.0000 |

Sample 2—Turbidity=0.223 NTU

| | |
|---|---|
| Glycerol | 24.7250 |
| PG | 70.0000 |
| CBD Isolate (≥98.5% Purity) | 5.2750 |
| TOTAL (% w/w) | 100.0000 |

CBD concentration in total sample was approximately 60 mg/ml.

Sample 3—Turbidity=0.309 NTU

| | |
|---|---|
| Glycerol | 24.7253 |
| PG | 60.6400 |
| Flavor Concentrate | 9.36000 |
| CBD Isolate (≥98.5% Purity) | 5.2747 |
| TOTAL (% w/w) | 100.0000 |

CBD concentration in total sample was approximately 60 mg/ml.

Each of the above samples were analyzed using a TL2310 ISO Turbidimeter from Hach, Colorado, 80539-0389, United States.

It can be clearly seen that the turbidity of these samples was well below 1 NTU. Thus, these formulations are considered to be stable.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/ or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An aerosolizable material comprising at least one cannabinoid and at least one carrier constituent, wherein the aerosolizable material does not comprise a surface active constituent, wherein the carrier constituent comprises propylene glycol and water, wherein the propylene glycol is present in an amount of at least 50% weight in weight (w/w) based on the total weight of the material and wherein the water is present in an amount of less than 11% weight in weight (w/w) based on the total weight of the material.

2. The aerosolizable material of claim 1, wherein the aerosolizable material does not comprise a constituent is selected from medium chain triglycerides (MCT) and tocopherol acetate.

3. The aerosolizable material of claim 1, wherein the carrier constituent further comprises one or more of glycerol, triethylene glycol, tetraethylene glycol, 1,3-butylene glycol, erythritol, meso-Erythritol, ethyl vanillate, ethyl laurate, a diethyl suberate, triethyl citrate, triethylene glycol diacetate, triacetin, a diacetin mixture, benzyl benzoate, benzyl phenyl acetate, tributyrin, lauryl acetate, lauric acid, myristic acid, and propylene carbonate.

4. The aerosolizable material of claim 3, wherein the carrier constituent comprises glycerol, in an amount of at least 50% weight in weight (w/w) based on the total weight of the material.

5. The aerosolizable material of claim 3, wherein the carrier constituent comprises both glycerol and propylene glycol.

6. The aerosolizable material of claim 5, comprising from about 60 to 90% weight in weight (w/w) propylene glycol and 10 to 40% weight in weight (w/w) glycerol.

7. The aerosolizable material of claim 6, comprising about 70% weight in weight (w/w) propylene glycol and 30% weight in weight (w/w) glycerol.

8. The aerosolizable material of claim 1, wherein the cannabinoid is cannabidiol.

9. The aerosolizable material of claim 1, wherein the cannabinoid is present in an amount of at least 5 mg/ml of aerosolizable material.

10. The aerosolizable material of claim 1, wherein the aerosolizable material is a liquid at about 25° C.

11. The aerosolizable material of claim 1, wherein the aerosolizable material further comprises one or more further constituents.

12. The aerosolizable material of claim 11, wherein the one or more further constituents is an olfactory active constituent.

13. An article comprising an aerosolizable material, the aerosolizable material comprising at least one cannabinoid and at least one carrier constituent, wherein the aerosolizable material does not comprise a surface active constituent, wherein the carrier constituent comprises propylene glycol and water, wherein the propylene glycol is present in an amount of at least 50% weight in weight (w/w) based on the total weight of the material and wherein the water is present in an amount of less than 11% weight in weight (w/w) based on the total weight of the material.

14. The article of claim 13, further comprising a reservoir containing the aerosolizable material, an aerosol generating component, an aerosol generating area, a transport element and a mouthpiece.

15. The article of claim 13, provided within a sealed container.

16. The article of claim 15, wherein the container is formed from a material which inhibits/prevents the passage of ultraviolet light therethrough.

17. The article of claim 15, wherein the sealed container comprises a blister pack with one or more hermetically sealed compartments.

18. The article of claim 14, further comprising engagement elements for engagement with a cooperating aerosol provision device, the cooperating aerosol provision device comprising a power source, a controller or both.

19. A method for producing an aerosolizable material comprising at least one cannabinoid and at least one carrier constituent, wherein the carrier constituent comprises propylene glycol and water, wherein propylene glycol is present in an amount of at least 50% weight in weight (w/w) based on the total weight of the material and wherein the water is present in an amount of less than 11% weight in weight (w/w) based on the total weight of the material, wherein the aerosolizable material does not comprise a surface active constituent, the method comprising combining the at least one cannabinoid and the at least one carrier constituent.

* * * * *